United States Patent [19]

Ch'Hayder et al.

[11] Patent Number: 5,103,403
[45] Date of Patent: Apr. 7, 1992

[54] REDUNDANT MODULAR ROBOT

[75] Inventors: Ameur Ch'Hayder; Didier Durand; Constantino Diaz, all of Toulouse, France

[73] Assignee: Logabex S.a.r.l., Toulouse, France

[21] Appl. No.: 397,412

[22] PCT Filed: Jan. 19, 1988

[86] PCT No.: PCT/FR88/00026
§ 371 Date: Aug. 16, 1989
§ 102(e) Date: Aug. 16, 1989

[87] PCT Pub. No.: WO88/05712
PCT Pub. Date: Aug. 11, 1988

[30] Foreign Application Priority Data

Feb. 4, 1987 [FR] France .................. 87 01884

[51] Int. Cl.⁵ .................. B25J 18/06; B25J 9/06; B25J 9/22; B25J 19/04
[52] U.S. Cl. .................. 395/98; 901/14
[58] Field of Search .................. 364/513; 901/14, 15

[56] References Cited

U.S. PATENT DOCUMENTS 4,964,062 10/1990 Ubhayakar .................. 364/513

Primary Examiner—Allen R. MacDonald
Attorney, Agent, or Firm—Harold H. Dutton, Jr.

[57] ABSTRACT

The invention relates to a redundant robot of the modular type permitting displacement of a terminal from an initial position to a final position. This robot comprises a succession of stages ($1_{i-1}$, $1_i$), each constituting a platform and six actuators arranged according to a closed angular architecture, a system of sensors associated with each stage, and control means permitting determining a configuration of the robot corresponding to the final position to be attained by the terminal and remotely operating the actuators for arranging the various stages according to this configuration. The control means comprises in particular means (26) for storing the space accessible by each platform, means (25) for inputting the final position to be attained, means (27) for computing the configuration of the robot, means (28) for computing the states of the actuators and a servo-interface for the latter.

23 Claims, 13 Drawing Sheets

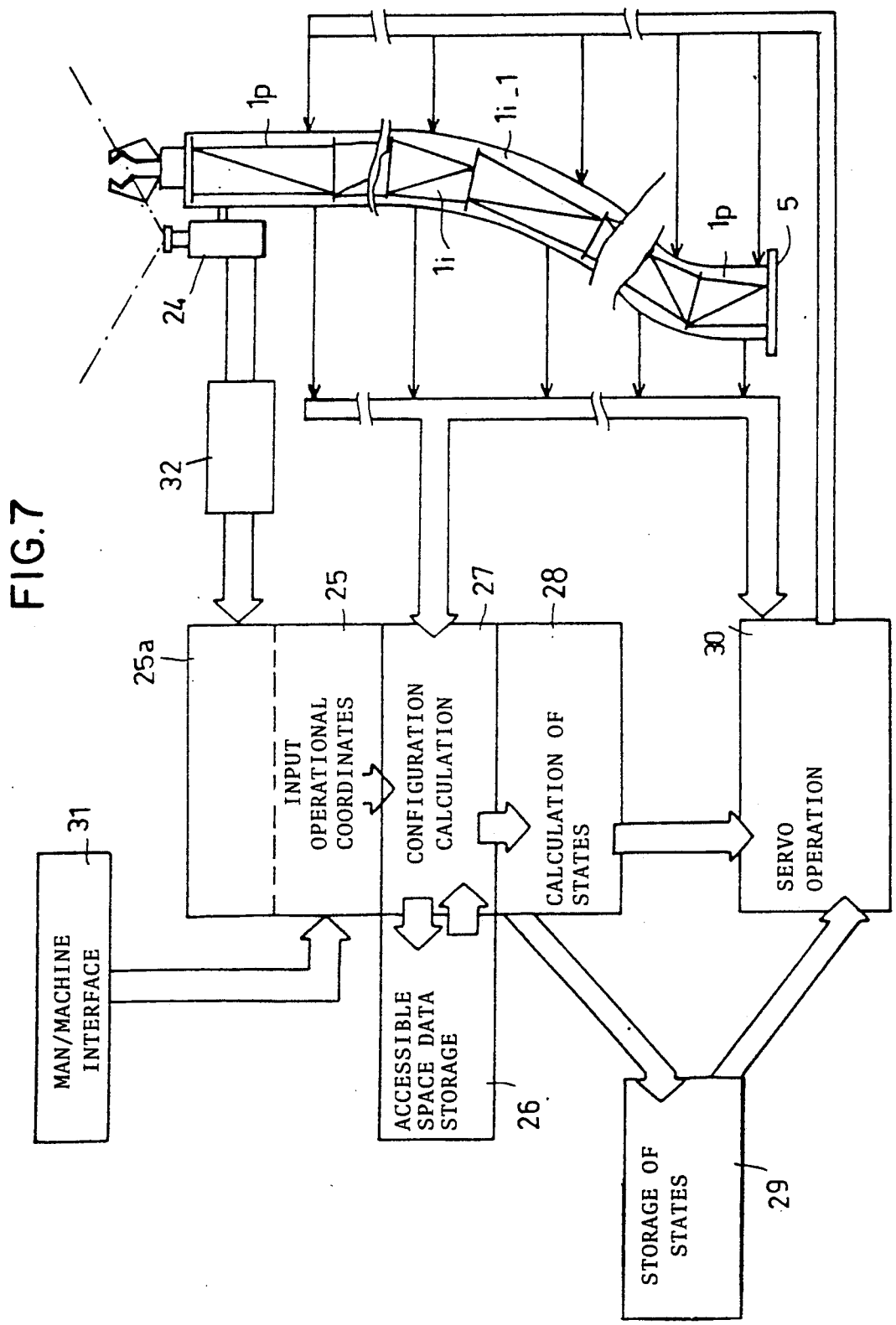

$t = \sqrt{x^2 + y^2}$

FIG.15
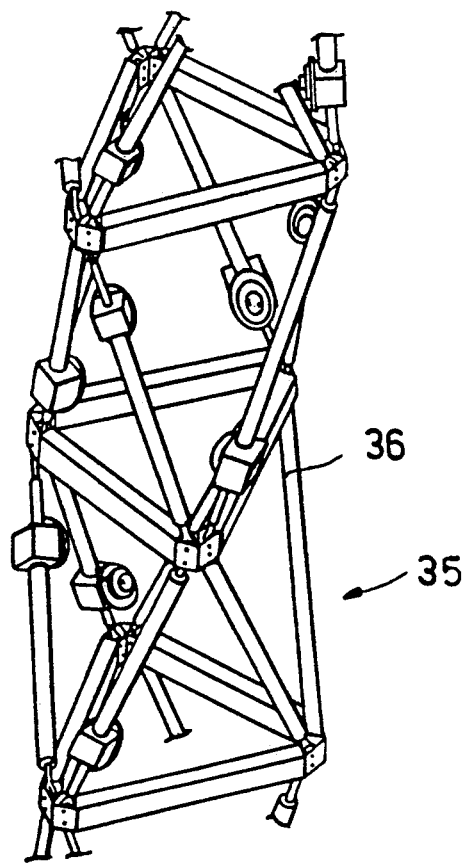
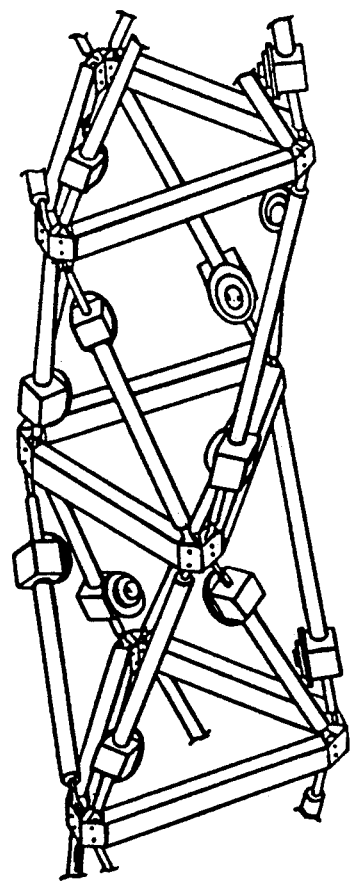

REDUNDANT MODULAR ROBOT

The invention relates to a redundant robot of the modular type, permitting the displacement of a terminal from an initial position to a final position.

Numerous robots have been conceived for automating the tasks in one industrial process or another, or for intervening in an environment inaccessible to man.

The oldest robots, termed industrial robots, have a mechanical architecture constituted by bodies or links connected between them in such a manner as to permit a rotation or a translation of one link with respect to other neighboring links. The links are generally different from each other in order to specialize the robot to a given type of task. The primary deficiency of these robots resides in their mechanical complexity and costliness, and in their very high mass with respect to the useful load able to be displaced, and this essentially for the reason of the working conditions in the flexure and torsion of the elements constituting these robots. Moreover, these robots are not redundant and are therefor incapable of functioning correctly in the case of one or several mobilities.

The robots known as redundant robots, have been conceived more recently for intervening in cumbersome or quasi-closed environments. By "redundant robot" is meant a robot having superabundant numbers of mobilities with respect to the number of mobilities necessary and sufficient to position and orient a terminal in space. Their mobilities in redundant numbers permit assuring a positioning and an orientation of the terminal in several different manners, such that these robots benefit from a flexibility of use which is much greater than before.

The following patents or documents illustrate existing robots:

French patent 2,494,618 describes a robot of the elephant trunk type with deformation in a plane (deficiency: access to very limited space).

International Patent 84/04722 describing an articulated robot the links of which are individually controlled by cable systems (deficiency: partial or total breakdown of the robot in the case of cable breakage).

French patent 2,378,612 describing a polyarticulated arm with spatial displacement controllable by cables from the bottom (deficiency: accessible space is relatively limited).

European patent 0,017,016 describing a flexible arm with spatial displacement controllable by cables (deficiency: non-controllable robot in case of failure of a transmission).

French patent 2,339,470 describing a flexible arm with spatial links permitting rotations in all directions (deficiency: relatively limited space access).

Eurpoean patents 0,108,549; 0,085,307 and 0,077,609 describing arms with multiple rotations, able to be displaced in crowded space (deficiency: very limited supported load).

Soviet Engineering Research, Vol 2, No. 12, December, 1982, pages 75-78, Melton Mowbrav, A.SH. Kolistor "Development and Investigation of Industrial Robots Based on Specification by 1-coordinates", disclosing a robot with 6 jacks in stages.

The mechanical structure described in the last article mentioned above seems to possess remarkable potentialities, but difficult problems of control, not heretofor resolved, preventing in fact the exploitation of these potentialities. Effectively, if in a single stage system, there is a simple geometric relation giving the length of the six jacks as a function of the terminal position, this is no longer the case in a system where several stages are combined. There is no longer the simple relation permitting, starting from a final desired position, deducing the lengths of the jacks and the article mentioned above does not furnish any teaching for operating the effective control of such a robot.

The present invention proposes to furnish an improved robot of the redundant type described above, provided with a control permitting the exploitation of all the potentials.

By "robot" is meant an articulated mechanical system constituted by a connection of at least two stages, with which is associated a control unit. In the following description, in a general manner the conventional vocabulary used in the technical field of robotics will be used.

Another essential object is to provide a robot benefitting from a great number of mobilities, permitting it to intervene in obstructed environments due to the choice of a path adapted from a great number of possible paths.

An essential object of the invention is to permit the manipulation of large loads, and to benefit from an appropriate load to mass ratio for a robot, of a value increased with respect to known robots.

Another object is to provide a robot having a good tolerance to problems, that is, able to execute a task even in case of trouble with certain elements.

Another object is to provide a simple mechanical robot the stages of which may be repetitive, either identically or with close dimensional modifications, each stage itself being constituted of repetitive elements.

Another object is to provide a modulable robot, extensible at will according to the type of task to be accomplished.

Another object is to provide a robot which is easy to repair by reason of the simplicity of its structure and the low number of components making up the robot.

To this end, the robot provided by the invention, permitting the displacement of a terminal from an initial position to a final position, is of the modular type comprising at least two stages arranged one after another, of which the first stage is secured to a base, and opposite thereto, a final stage carries the terminal.

By the term "terminal" is meant any system, active or passive, adapted to the application envisaged, for example: a pincer, tool, camera, etc. . . .

By the term "position" is meant a position and/or an orientation in space, of a mark connected to the element considered with respect to a reference mark.

By the term "modular" is meant a repetition of stages having the same architecture, these stages able to be rigorously identical or different by their dimensions (auxiliary stages of a different type may, in some cases, be interposed between the modular stages as will be seen below.)

The robot provided by the invention is of the type in which each stage comprises a platform and six linear actuators, each articulated toward an extremity, on the platform of the stage considered by a connection of a ball and socket joint type, and towards its opposite extremity on the platform of the preceding stage (or on the base for the first stage) by a connection of the same type, these six linear actuators being arranged according to a closed angular architecture of a type that two neighboring actuators are found articulated in the vicinity of one another to a platform and are found on the opposite end articulated at a distance on the other platform in order to form an angle between them, each stage comprising a system of sensors adapted to deliver signals representative of the relative position of the platform of said stage with respect to that of the preceding stage (or with respect to the base for the first stage.)

The robot is characterized in that it comprises a control unit associated with the actuators and constituted by:

means for storage of data, termed accessible space data, representative of positions accessible by each platform in a reference system connected to the preceding stage (or to the base for the first stage), means for selecting operational coordinates representative of the final position to be attained, calculating means, termed configuration calculating means, adapted to have access to the accessible space data storage means and ro receive the operational coordinates coming from the selecting means, said configuration calculating means containing an iterative calculating program corresponding to the following procedure:

calculating the distance between the position of the terminal corresponding to the configuration obtained at the preceding stage and the desired final position,
  calculating the Jacobian displacement matrix associated with the configuration obtained from the preceding stage,
  executing logical operations between the Jacobian matrix and the distance in order to determine a new position per platform, the totality of said positions being representative of a new configuration of the robot,
  verifying the suitability of these positions with the accessible positions for each platform, and in case of unsuitability, substituting for calculated position, an accessible position,
  determining the position of the terminal corresponding to the new configuration,
  repeating this procedure until obtaining a distance between the final position and the last calculated position of the terminal less than a predetermined variation for determining a configuration of the robot for which the terminal is situated in the final position, and delivering the generalized cordinates representative of said configuration or an impossibility information;

calculating means, called status calculating means, adapted to receive the generalized coordinates representative of the configuration of the robot and adpated to calculate for each stage, status data corresponding to the six linear actuators, an operating mechanism arranged for receiving the status data from the status calculating means, as well as the signals coming from the sensor system and adapted to deliver the proper magnitudes of control for controlling each of the linear actuators.

By "linear actuator" is means any electric, hydraulic, pneumatic, etc. device able to generate upon command a translation between its two extremities by which this actuator is articulated on the platform of the stage considered and on that of the preceding stage. The actuators may particularly be comprised of cylinders, screw/nut systems, but also by more complex mechanisms of the type of compasses or gear racks.

By the term "ball and socket joint" is intended in a general manner any rotary connection able to permit at least two rotations on perpendicular axes, and in particular: ball and socket joint permitting three concurrent rotational axes, universal joint (permitting two concurrent axes of rotation), composite connection (permitting two non-concurrent axes of rotation).

The "operational coordinates" and the "generalized coordinates" represent respectively the position of the terminal with respect to a reference mark, and the position of the platforms while considering as a reference, for each platform, the neighboring platform.

By "configuration of the robot" is meant the totality of generalized coordinates of all stages of the robot, reflecting the general configuration of the robot in space.

By "status information" is meant for each actuator a control datum representative of the status which the actuator must take.

By "distance" is meant the mathematical distance in a space of 'n' dimensions, where 'n' is the number of operational coordinates necessary to represent a position (in the most general case: three position coordinates and three orientation coordinates.)

The robot according to the invention is thus comprised of stages which, because of their triangular architecture, work both in tension and in compression, both at the level of their linear actuators and of the platforms. The platforms may themselves be comprised of triangular systems connecting the zones of articulation of the actuators, in such a manner as to radically suppress any constraints of flexion/torsion. It is also possible, according to the application, to provide platforms of a different structure (ring, . . . ): certain constraints of flexion/torsion may then be developed locally in these platforms, but conserving the redundant values with respect to those being performed in most known robots. The robot may thus have a lightweight structure, with little deformation under load, capable of manipulating high masses. The placing in series of at least two stages of structure such as hereinabove defined carries along with it a redundance of mobilities permitting obtaining a given final position of the terminal by a multitude of combinations of states of the actuators. Moreover, because of this redundance, in case of trouble with one or several actuators, the space accessible by the terminal (working space of the robot) is reduced, but for a robot comprised of at least several stages the number of mobilities remains satisfactory.

The control unit permits exploiting these mobilities: starting from a given initial position, it permits determining, if that is possible, a configuration corresponding to the final position to be attained and to calculate the corresponding status information for the actuators. The determination of the configuration is carried out starting from the selected operational coordinates (final position to be attained) and from the accessible space data stored in the storage means mentioned above (these data representing the accessible space for each platform in a reference system connected to the platform of the preceding stage). The defined iterative procedure proceeds by steps while using for the current step the configuration obtained from the preceeding step. For the first iteration, an initial configuration is used which may be either entirely conventional, or the real initial configuration of the robot calculated from the signals from the sensors.

The use of the mathematical tool constituted by the Jacobian displacement matrix associated with the configuration of the robot permits a simple linearization of the relationship connecting the operational coordinates and the totality of general coordinates representative of this configuration. This relation is easy to use for determining, by its general coordinates, a new configuration of the robot from the known preceeding configuration, by logic operations such as inversion of the Jacobian matrix and multiplication by the distance (or a fraction thereof). In spite of the simplified character if the Jacobian relationship, the iterative procedure by successive steps permits a convergence until obtaining a precision less than a predetermined variation.

The verifications of suitability carried out in the iterative process defined above comprise testing if the positions of the new configuration are or are not accessible, that is, if the calculated position of each platform is an accessible position thereof. In the negative, the substitution consists in replacing the invalid calculated position by an accessible position according to a preestablished criterion, notably of proximity.

The determination of the position of the terminal corresponding to the new configuration (the case being, with substitution) is carried out by a simple geometric calculation starting from the totality of calculated positions representative of the configuration. This determination permits calculating the distance for the following iterative stage.

According to a first embodiment, the storage means for the accessible space data comprises memory means, storing for each architecture of stages a database containing the minimum and maximum lengths of this actuator and the maximum angles which the actuator may take with respect to the normals to the two platforms to which said actuator leads.

This embodiment presents the advantage of reflecting in a precise manner the possibilities of movement of a stage (conditioned by its technological components), and requiring little memory space, since four data per actuator are sufficient to characterize the accessible space. However, as will be seen below, the calculations carried out by the configuration calculating means are longer with respect to the following solutions.

According to another embodiment, the accessible space data storage means comprises means for storing a calculating program containing, for each architecture of the stage, relationships connecting the position (x, y, z) of the center of the platform of the stage with respect to the neighboring platform and the possible rotation ($\alpha$) of said platform following all directions of space.

In this embodiment, the space accessible by each platform (in a reference system connected to the preceding platform) is modelled by the mathematic relationships connecting the accessible space data. These relationships are contained in the calculating program mentioned above which is preliminarily loaded in the storage means, as a function of the architecture of the robot. It should be noted that by the term "program" is included a series of instructions comprising computer software, as well as cabled circuits able to execute instructions defined by the circuits. This embodiment which is slower in the time of calculating has the deficiency of leading to a loss of possibilities of movements by reason of the modelling.

In another embodiment, the accessible space data storage means comprises memory means storing, for each architecture of the stages, a database subdivided into zones corresponding to nodes of a spatial breakdown: each zone contains data representative of the position of the corresponding node and the possible rotations in this node in predetermined directions.

In this embodiment, the space accessible by each platform (in a reference system connected to the preceding platform) is subdivided according to a spatial breakdown and the positions of the nodes of this breakdown are preliminarily stored in the memory means as a function of the architecture of the robot. The calculating time then becomes very short, but the storage space necessary is much greater than in the preceding cases.

The means for selecting the operational coordinates representative of the final position to be attained may comprise a man/machine interface, adapted to permit acquiring the coordinates representative of the final spatial position to be attained by the origin of a reference point connected to the terminal and/or the coordinates representative of the final orientation to be attained by said reference point. In this case, the acquiring or selecting means may take the form of a data entry keyboard, a touch screen, a screen associated with an electronic pointing pen, a manipulation system associated with a screen, a voice recognition system, etc.

The selecting means may also comprise an interface with an operational coordinate injection means, stored or calculated, in order to achieve the task in the absence of an operator.

The acquiring means may also comprise a remote sensing system adapted to detect a target to be attained, and calculating means adapted to deliver, from the signals coming from the remote sensing means, the coordinates representative of the spatial position and/or the spatial orientation of the target. The remote sensing system, itself known (a camera, especially a video camera, a system of magnetic, ultrasonic or infrared sensors . . . ) may be embarked on the robot or independent thereof.

The structure of each stage of the robot according to the invention may be constituted according to the following embodiment: the six actuators for each stage are articulated, on the platform of the stage considered in three distinct zones of said platform, and on the platform of the preceding stage (or on the base for the first stage) in three distinct zones of said platform (or said base); further, these six actuators may be identical, the three zones of articulation of the actuators on the platform of the stage considered and the three zones of articulation of said actuators on the platform of the preceding stage being arranged at the apices of equilateral triangles.

The platforms may have various forms, as functions of their application. Generally, they will be achieved by a hollow triangular structure, preserving a central passage along the robot in order to house a transmission network (feed and control of the actuators, transmission of signals from the sensors, and even feed and control of an active terminal).

In some cases, one or several platforms may comprise a rigid member of an elongated form, the actuators of the stage concerned being articulated on an extremity of said member, and the actuators of the following stage being articulated on the opposite extremity of said member. Thus there is obtained a more filiform robot, of greater ability for a given number of stages.

Further, it is also possible to provide auxiliary stages interposed between the aforementioned stages, called modular stages, each auxiliary stage being comprised of a platform of two, three or four linear actuators and a complementary number of rigid bars, in such a manner as to obtain a closed angular isostatic structure with six sides, having a geometry analogous to that of a modular stage. These arrangements permit, in certain applications, to simplify the robot when all of the mobilities are not necessary.

The invention having been described in its general form, other characteristics, objects and advantages will become apparent from the description which follows in reference to the accompanying drawings which show, by way of non-limiting example, the various embodiments. In these drawings:

FIG. 7 is a block schematic diagram showing the control unit for the robot;

FIGS. 13, 14 and 15 are schematic views of variations of the robot (shifted articulation zones, platform of an elongated form, presence of auxiliary stages).

The robot shown by way of example comprises a modular architecture such as shown schematically in FIGS. 1 to 5, associated with a control unit of which the schematic block is provided in FIG. 7.

This robot comprises several superimposed stages such as the first stage $1p$, current stages $1_{i-1}$, $1_i$, and last stage $1d$.

Figure 1:
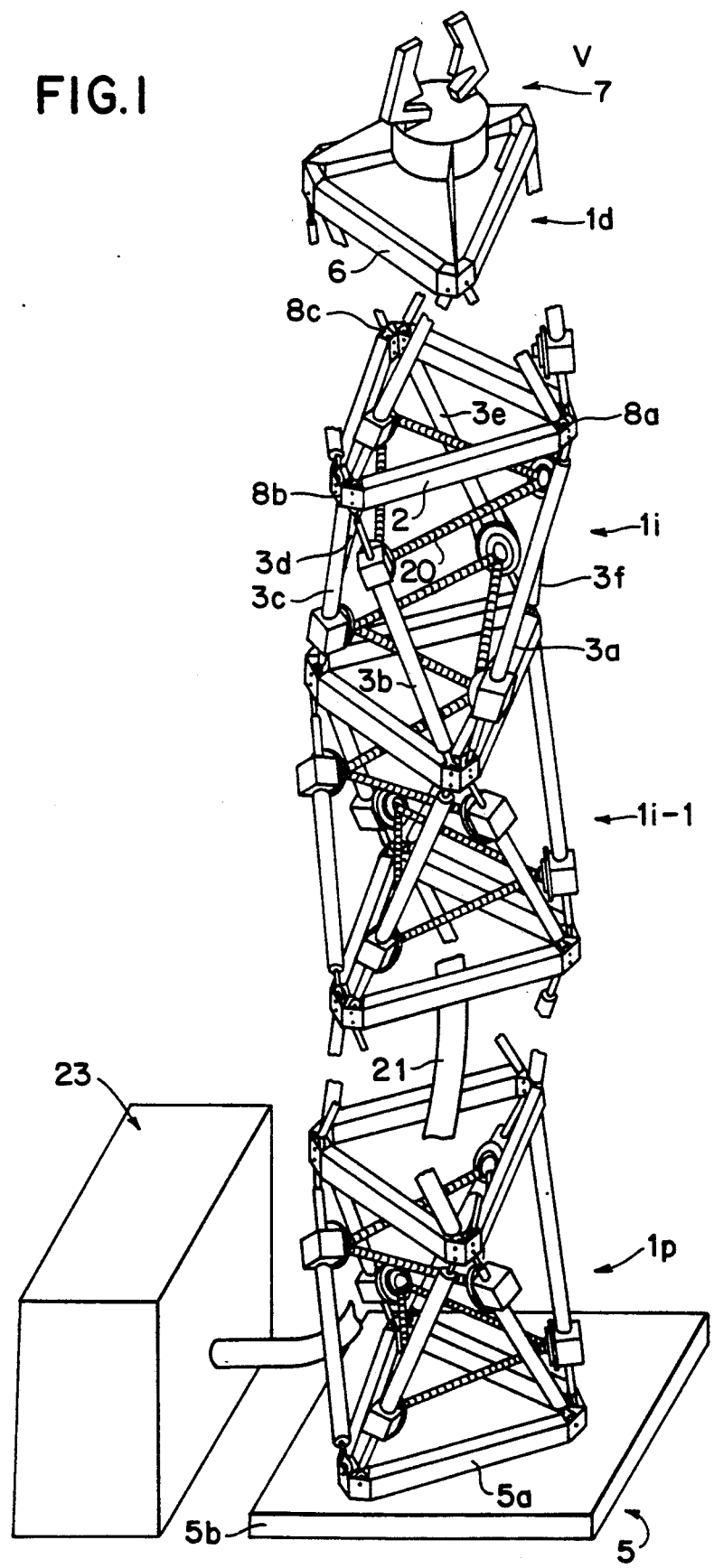
FIG. 1 is a cross-section in perspective, with portions removed, of one embodiment of the robot.
Figure 2:
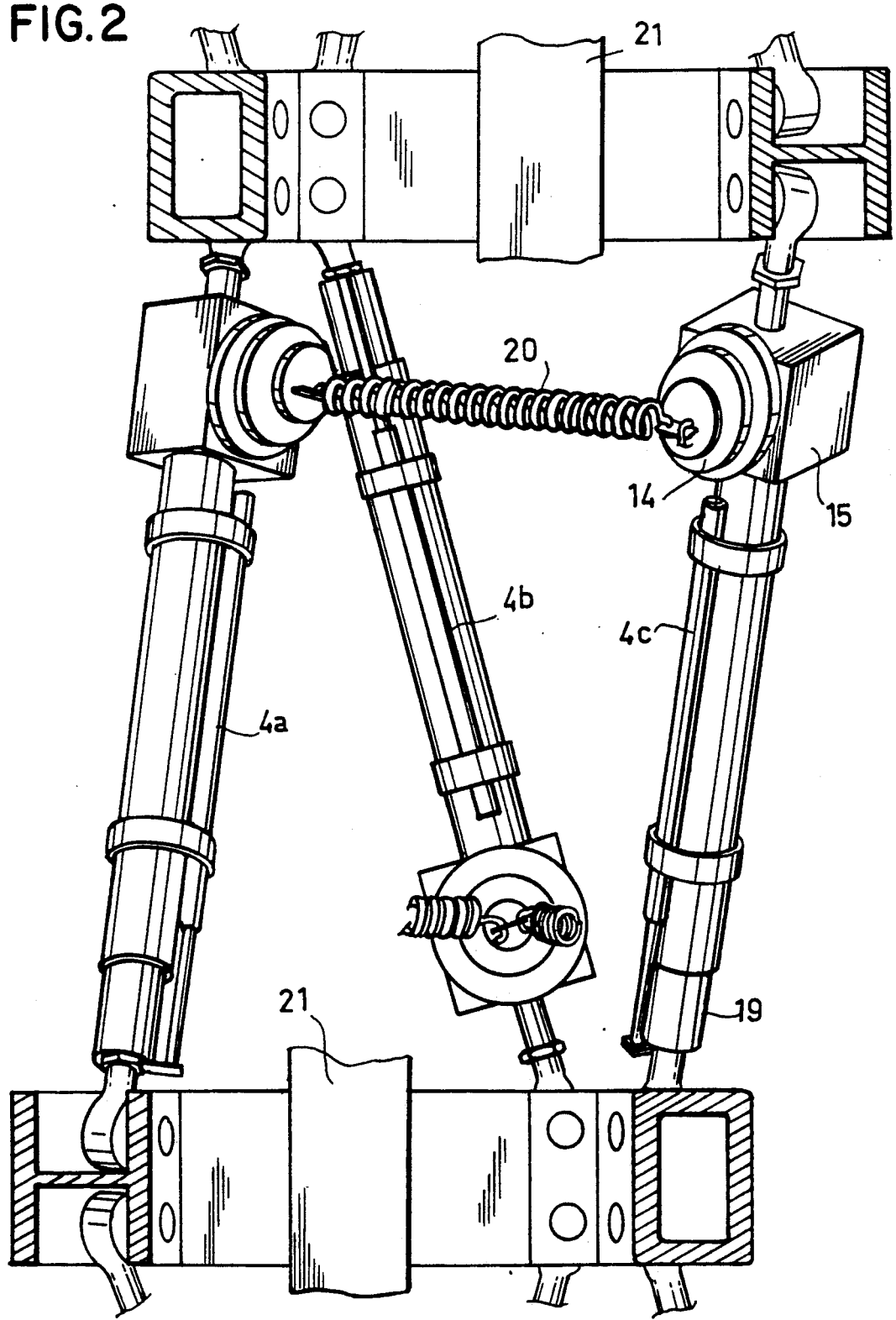
FIG. 2 is a cross-section along a vertical plane AA' of one stage of the robot.
Figure 3:
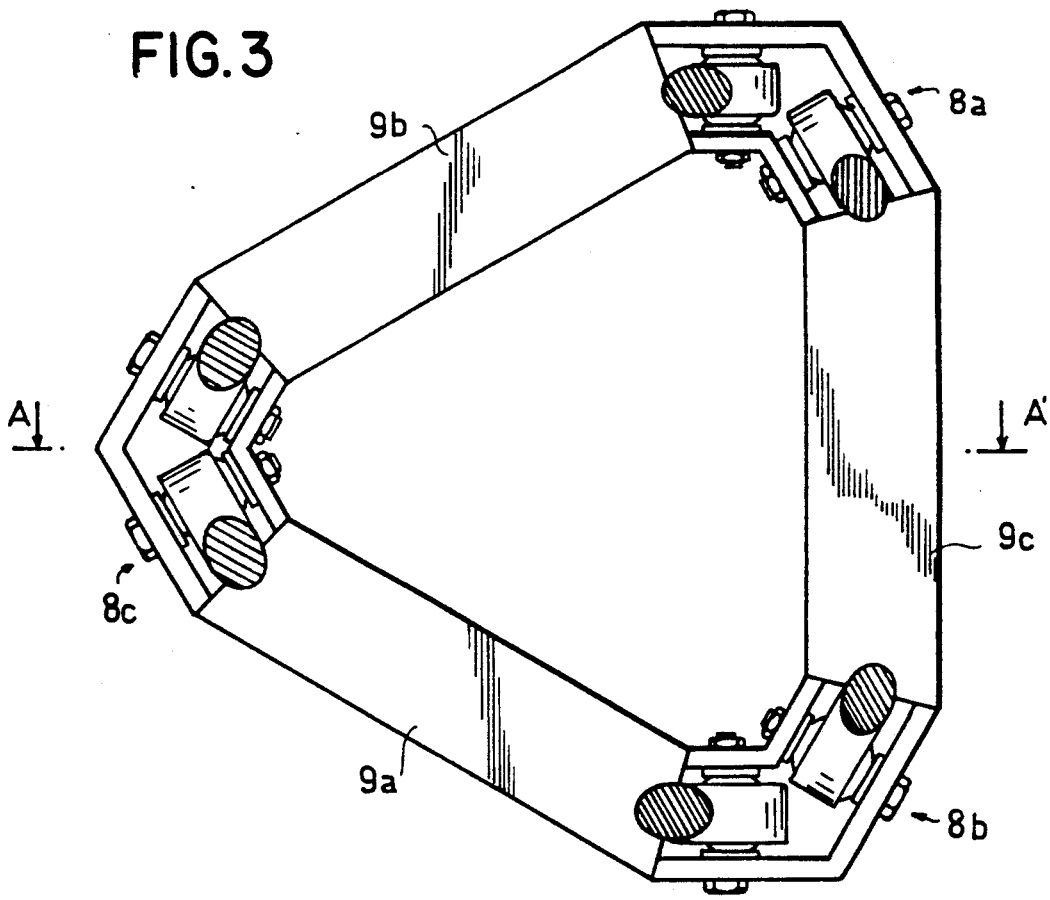
FIG. 3 is a top view of one platform with the departure platform of the actuators.

Each stage is essentially formed by a platform 2, six identical linear actuators such as 3a, 3b, 3c, 3d, 3e and 3f for the current stage and by a set of sensors such as shown schematically as 4a, 4b and 4c in FIG. 2 (out of concern for simplification, these sensors have not been shown in FIG. 1).

The jacks of the first stage 1p are coupled to a base 5 which may be formed by a platform 5a secured to a foundation 5b.

The platform 6 of the last stage 1d carries a terminal 7 adapted to the task to be accomplished (pincers in the example shown, ultimately associated with a remote control camera).

The number of stages is at least equal to 2 and will in practice be on the order of 4 to 12, this changeable number being adapted to the task to be accomplished.

In the example shown, each platform such as 2 comprises three articulation blocks 8a, 8b and 8c arranged at the apices of an equilateral triangle and connected by the cross-members 9a, 9b, 9c, arranged in a triangle.

Each articulation block is formed by an angle beam having an H-shaped cross section carrying above and below its web portion the articulation spindles such as 11 connected to the side flanges of the beam. Each spindle 11 is provided with a spherical part 12 guiding another spherical part 13 fixed to the extremity of the rod of the actuator considered, the assembly 11, 12, 13 forming a ball and socket joint which permits a rotation about the spindle 11 and about the longitudinal axis of the actuator rod, and about a third axis, orthogonal to the other two.

In the example described, on each platform, the three zones of articulation of the actuators of the stage (below the web) are superimposed with the three zones of articulation of the actuators of the following stage (above the web) which permits providing only three articulation blocks per platform.

The cross-members 9a, 9b, 9c are secured between the articulation blocks 8a, 8b, 8c and in the example, formed by beams of rectangular cross-section.

The structural simplicity of such a platform, subject only to the constraints of tension/compression, is apparent, presenting an excellent permissible load to mass ratio.

Figure 4:
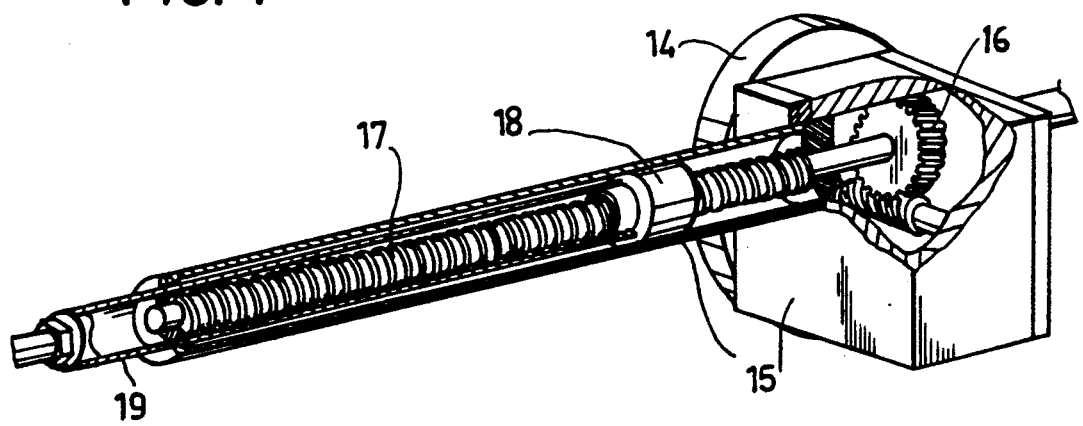
FIG. 4 is an exploded schematic view of a linear actuator.
Figure 5:
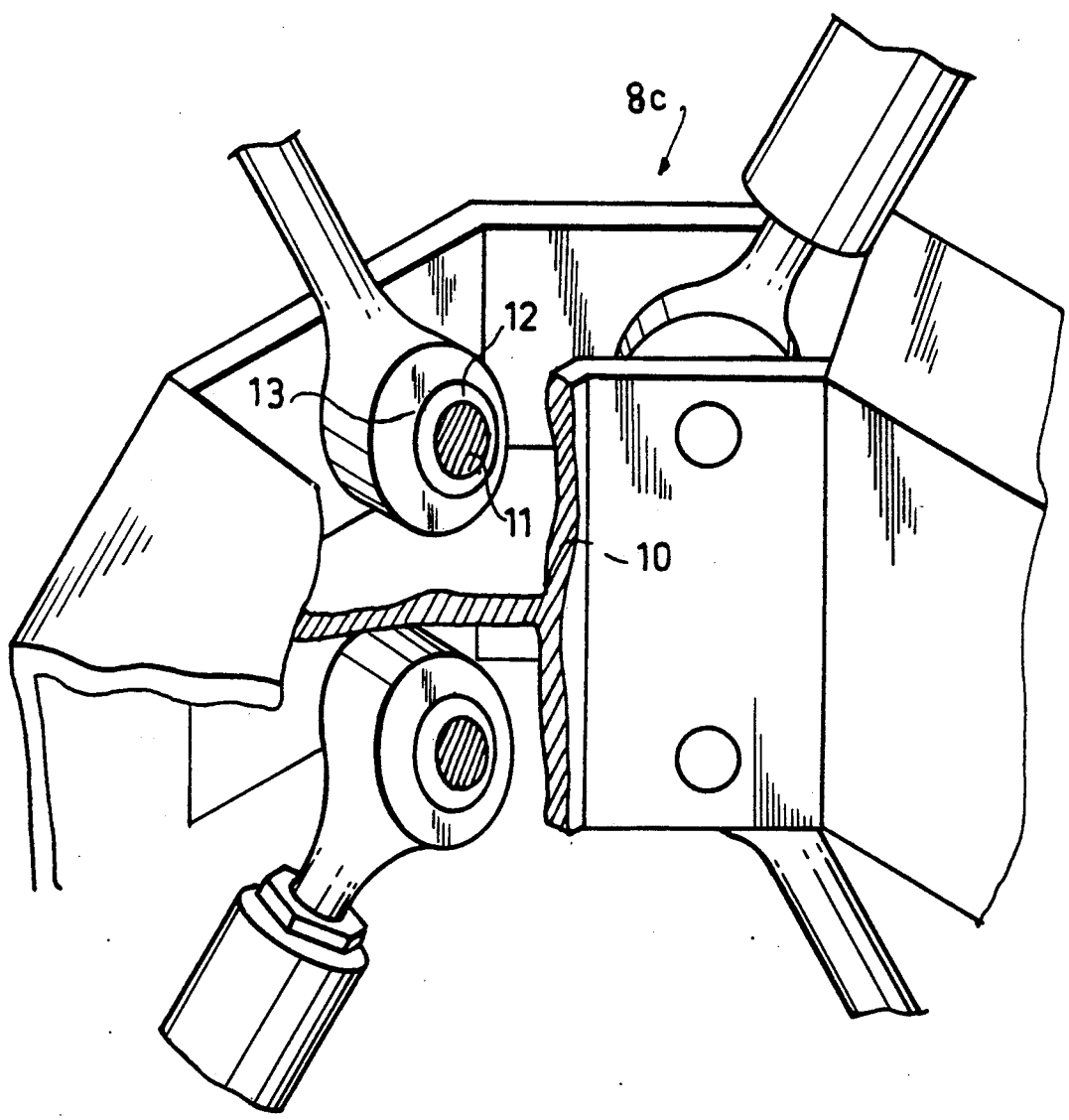
FIG. 5 is a detailed perspective view, showing a zone of articulation of a platform.

The six actuators of each stage are in the example formed by electric linear actuators of a known type, such as shown in FIG. 4. Each actuator comprises an electric motor 14 carried by a housing 15, enclosing a reduction gearing 16 which rotates a screw 17 mounted in a cylindrical extension of the housing 15.

The housing 15 is articulated on a platform by a ball and socket joint such as already described.

Further, each actuator comprises a threaded bushing 18 in association with the screw 17 and secured to a casing 19. This casing is keyed with the extension of the housing in order to be able to slide with respect thereto without relative rotation The extremity of the casing 19 is articulated through a ball and socket joint such as described on the adjacent platform.

It will be understood that other types of actuators may be provided (hydraulic or pneumatic cylinders . . . ).

The six actuators of a stage are arranged as shown in these FIGURES, according to a closed angular architecture, of the type in which two adjacent actuators may be articulated, for a platform, on the same articulation block and, for the adjacent platform, on two adjacent blocks.

In the example shown in FIGS. 1 and 2, the adjacent actuators are positioned with their heads wedged.

The parasitic rotation of each actuator about its longitudinal axis is neutralized, in the example, by springs such as 20 which connect between the motors 14 (any other system may be provided).

Each electric actuator is associated with a sensor such as 4a, 4b, 4c, able to deliver a signal representative of the length of said actuator. For example, these sensors are linear sensors with resistive tracks, having a cylindrical body secured to the extension of the housing 15 of the actuator and a movable rod, fixed at its extremity to a solid foot of the casing 19 of said actuator.

The electrical connections to the sensors and the motors, as well as to the terminal if it is active, are housed in a sheath shown at 21 in FIGS. 1 and 2, passing through the central openings of the platforms and running along the robot. In the case of a hydraulic or pneumatic terminal, this sheath also contains the appropriate fluid conduits.

The robot may further be externally covered with a flexible protective covering connected to the platforms (for example a bellows fixed around the platforms).

Figure 6:
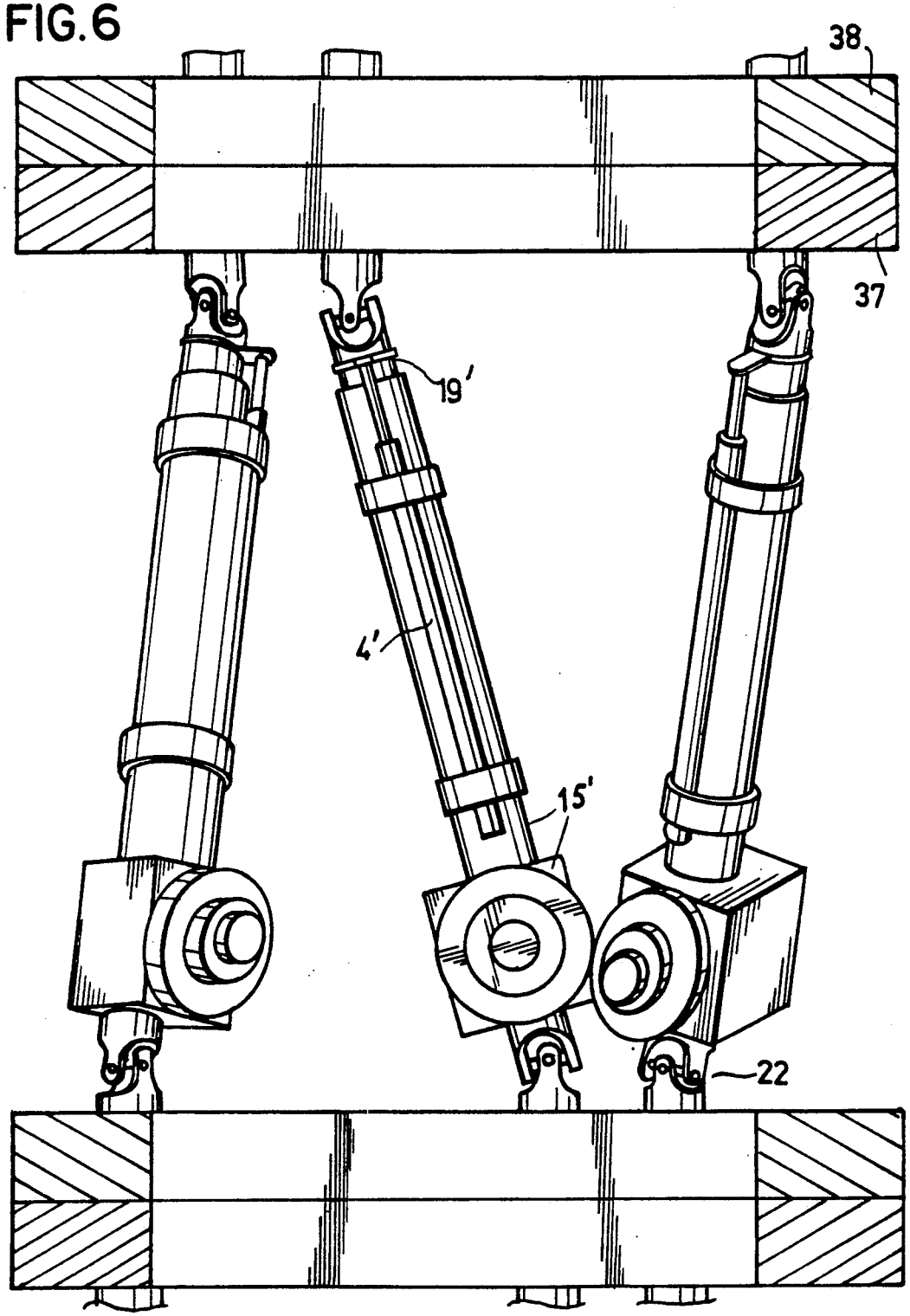
FIG. 6 is a detailed cross-sectional view through a vertical plane, of a variation of the robot.

FIG. 6 is a partial view of a variant stage, in which the preceding ball and socket joints are replaced by universal joints 22. Each universal joint permits a rotation about two perpendicular axes. In this case, the casing 19' of the actuator is no longer keyed on the extension of the housing 15' in order to permit the rotation of these two elements.

Further, the movable rod of each sensor 4' is fixed to a flange which may be turned about the casing 19'.

In addition, in the example shown, the actuators of one stage are all positioned in the same direction, with their motor at the lower part, in order to lower the center of gravity of the assembly of the robot.

Further, in this example, each platform is comprised of two identical plates 37, 38 assembled one on the other by screws and nuts, with the pions centered in view of their relative positioning. The plates shown in the drawing have a circular shape.

This embodiment permits modifications of the robot more easily. In effect, this arrangement enables the provision of modules comprised of a lower plate, the system of jacks and sensors, and an upper plate, very easily added or removed without modification of the attachments of the actuators.

FIG. 7 is a block schematic showing the control unit of the robot, with the connections symbolized to the various stages of the robot. In this example, the terminal carries a pincer and a D.T.C. camera (load transfer device) symbolized at 24.

The control unit may be housed in an enclosure which is shown schematically at 23 in FIG. 1 near the base 5.

This control unit comprises essentially the following electronic assemblies: means 25 for selecting or acquiring operational coordinates representative of the final position to be achieved for the terminal, means 26 for storing the accessible space data for each platform, configuration calculating means 27, status calculating means 28, auxiliary status storage means 29, an operating mechanism interface 30.

The acquiring or selecting means 25 is provided with a man/machine interface 31 which permits a direct input of the operational coordinates of the final position to be attained: coordinates of the position of the center of the terminal and orientation coordinates, in a reference trihedron.

The acquisition may also operate in a remote sensing mode due to the camera 24 which delivers a flood of sequencing information to an intermediate treatment unit 32 adapted to elaborate and deliver the operational coordinates mentioned above representative of the final position to be attained for the terminal. The camera 24 and the treatment unit 32 are formed by any remote sensing system of a known type, able to recognize a target to be reached (mechanical piece . . . ), and to extract therefrom information on the position and/or orientation, and deliver an electric signal representative of the corresponding coordinates of the target to a reference connected to the camera (for example a remote sensing system known as "Visiomat", available from the Allen-Bradley Company and Robotronics). Moreover, the acquiring means 25 may comprise a conversion subassembly 25a, adapted to transform, when needed, the coordinates representative of the position of the target to the reference connected to the camera into operational coordinates with respect to a reference system connected to the base of the robot.

According to a first embodiment, the storage means 26 comprises memories containing data representative of the possibilities of displacement of the different components used: actuators and connections thereof on the platforms. In the most complex case, where all of the actuators and all of the connections will be different, the number of data to be stored is 4 per actuator (minimum length, maximum length, maximum angle of pivoting of its connection at the base, maximum angle of pivoting of its connection at the tead), or for the overall robot: $24n$ (where n is the number of stages).

In practice, the actuators and the connections of a stage will be identical between them, which reduces to 4 the number of parameters representative of the accessible space of this stage. Moreover, certain stages may be identical and the number of data to store becomes equal to $4n'$, where $n' \leq n$ corresponds to the number of different types of stages. It is then realized that such a memorization is very low in necessary memory space.

According to another embodiment, the storage means 26 comprises memories containint, for each architecture of the stage, the relations connecting the accessible space data constituting in the example, the x, y, z positions of the center of the platform with respect to the preceding platform, and in each position, the possible rotation $\alpha$ about all of the directions of space. By possible rotation $\alpha$ is intended for a given position, the smallest value among the assembly of the angles of maximum rotation in all directions. Thus, regardless of the direction of the space, the platform is assured to be able to turn through this angle when it is found in the considered position.

For a robot having identical stages, the accessible spaces are identical for all of the platforms and may be modelized by the mathematical relationships between the three coordinates of position x, y, z, and the possible rotation$\alpha$ of the type:

$$f(x, y, z, \alpha) = 0$$

If the platforms are not identical, there are stored as many relationships of this type as there are types of platforms.

Figure 8A:
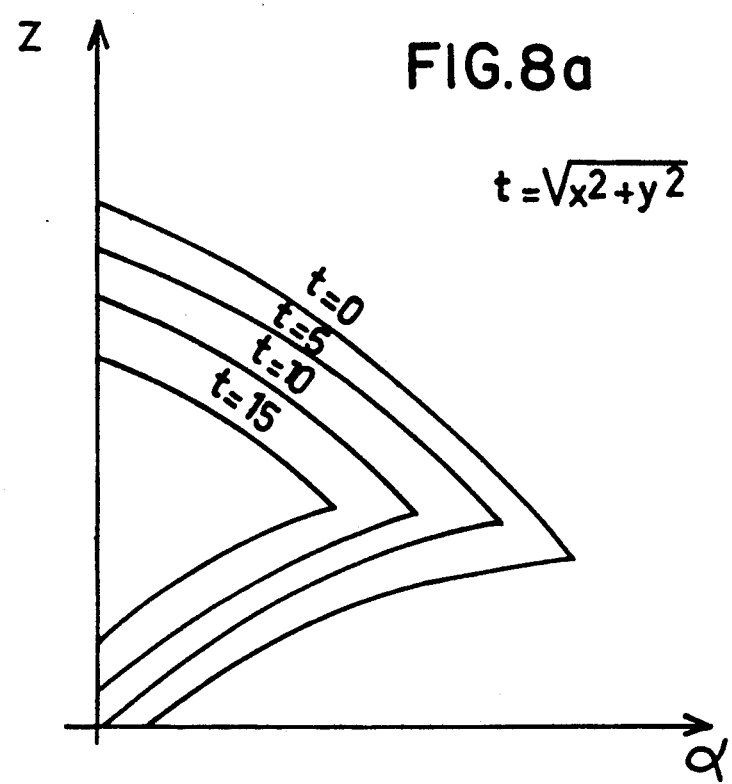
FIGS. 8a and 8b are diagrams showing a first mode of determination of the accessible positions for a platform.
Figure 8B:
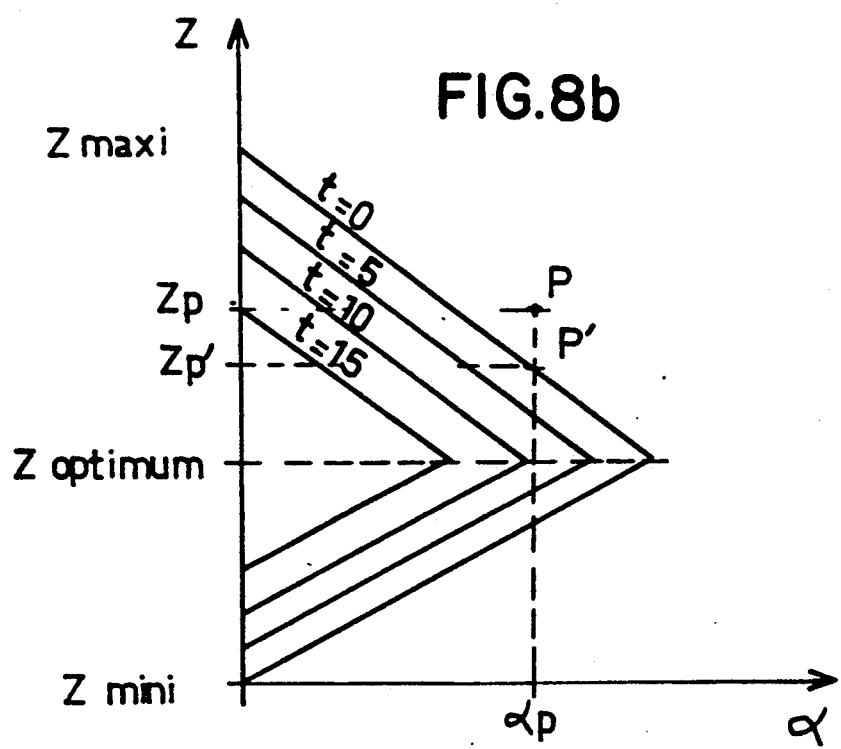

FIG. 8a is a diagram giving the possible angle $\alpha$ as a function of x, y and z. This family of curves obtained point by point by the calculation presents a discontinuity and may be modelized by two families of rules such as shown schematically in the diagram of FIG. 8b. These rules are represented by the equations of the aforementioned type and are stored in the means 26 in the form of a calculating program able to resolve these equations. (It can be determined that for an optimum altitude z, the possible angles $\alpha$ pass through a maximum).

According to another embodiment, the accessible space data for each platform are stored in the storage means 26 in the form of a database.

Figure 9A:
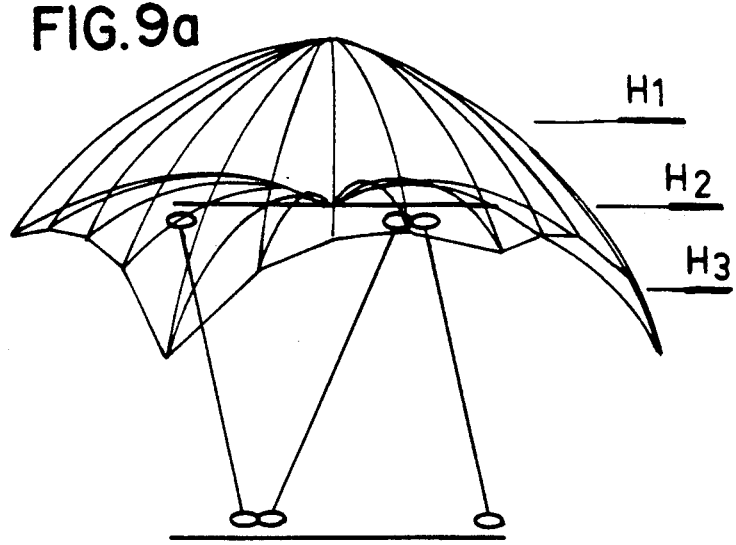
FIGS. 9a, 9b, 9c and 9d are schematic views showing another mode for determination of these accessible positions.
Figure 9B:
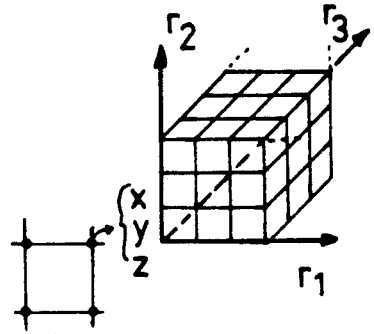
Figure 9C:
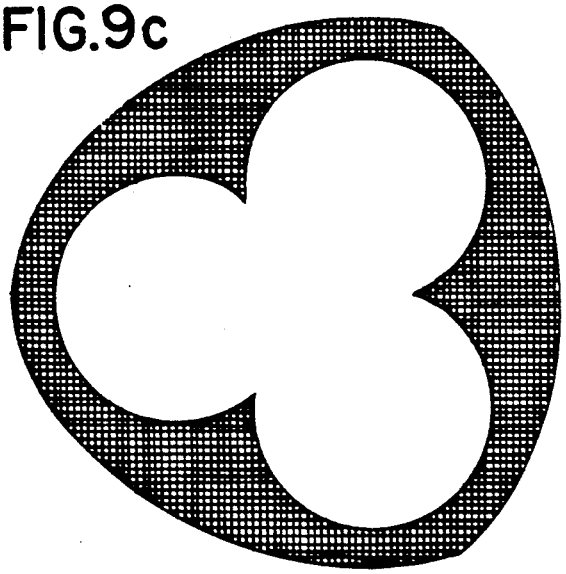
Figure 9D:
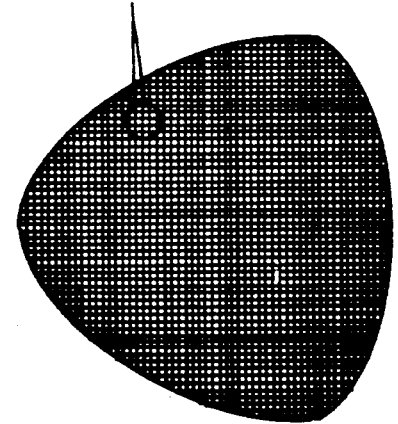

FIG. 9a symbolizes the accessible space, in position through the center of a platform with respect to the preceding platform. FIGS. 9b, 9c and 9d are horizontal sections of this space at different heights, respectively $H_1$, $H_2$, $H_3$.

This accessible space is divided into a three dimensional breakdown, and for each node of the breakdown, is stored in a table, itself of three dimensions, as is shown schematically in FIG. 9b, relative to the possible rotations in this node. To this effect, while the positions are made discrete by the breakdown, the rotations are made discrete by amplitudes (for example, degree by degree). For example, in a table appropriate to a given node, a given division corresponds to three discrete values of predetermined angles of rotation ($r_1$, $r_2$, $r_3$) and contains binary information of the possibility or impossibility of satisfying the combination $r_1$, $r_2$, $r_3$ at the node x, y, z. The database is initially established by the calculation while establishing by a conventional breakdown the nodes and the corresponding tables and by testing the possibility or impossibility for each case of each table (considering the positions and the corresponding orientations of said case), the database being then stored in the memory means 26.

This storage, due to a breakdown, presents the advantage of modelling the accessible space in a more realistic manner than the preceding solution (and therefor losing less of the actually accessible positions), but the inconvenience of having a greater need of memory and verification strategy. It must be emphasized that the first solution is the best performing because it follows in a very wide manner the real possibilities of movement of the actuators.

The means 27 for calculating the configuration is intended to determine a configuration of the robot (by the totality of the generalized coordinates: coordinates of a reference connected to each platform with respect to the preceding platform, or to the base) in which the terminal is positioned in the final position to be attained (position, orientation).

Figure 10:
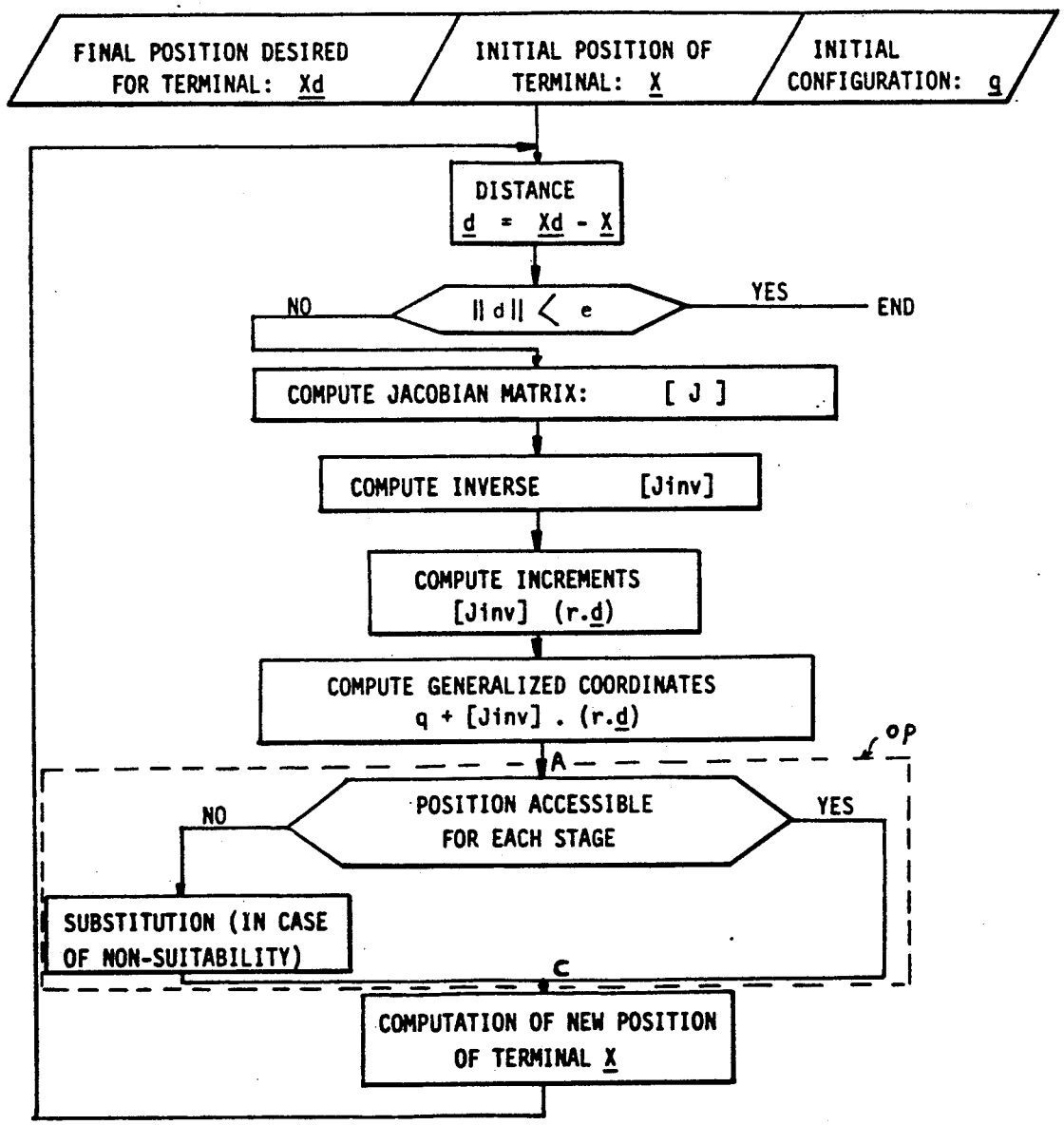
FIGS. 10 and 11 are logic diagrams showing the iterative procedure for determination of a configuration of the robot by the configuration calculating means.

This configuration calculating means comprises a processor of a known type comprising an iterative calculating program the logic diagram of which is shown in FIG. 10.

For starting the iterative calculation, the calculating means makes the selection of the final position to be attained by the terminal Xd (operational coordinates selected: position, orientation) and an initial position X of said terminal. This latter may be represented by the arbitrary coordinates preliminarily stored in an auxiliary memory of the processor or by the calculated coordinates during a preliminary step from the signals emitted by the sensors (representing then the real configuration of the robot at the instant considered). In this latter case, the processor is provided with an auxiliary calculating unit which is able to furnish the operational coordinates corresponding to a given configuration.

The first operation of iterative calculation consists in calculating the mathematical distance d between the final position and the initial position preliminarily determined. This distance is determined by a vectoral calculation, term by term.

One then tests whether the distance obtained is or is not less than a predetermined variation —e—(comparison of the norm of the distance with respect to the scalar —e—). In the affirmative the process is stopped since the configuration of the robot (either initial, or calculated in the preceding step) constitutes the solution (to the variation —e—close to that allowed).

In the negative, the Jacobian matrix of displacement [J] is calculated, corresponding to the initial configuration or to the configuration obtained in the preceding step.

As is known, the Jacobian displacement matrix is constituted by the terms representing each the first derivative of the generalized operational coordinates with respect to each of the generalized coordinates of all of the stages. The term i, j, of this Jacobian matrix is thus equal to:

$$\frac{\delta f_i}{\delta q_j}$$

where f is the relationship connecting the noted generalized coordinates to the noted operational coordinates X:X=f(g), i varying from 1 to n, where n is the number of operational coordinates representative of a final position, j varying from 1 to m, where m is the total number of generalized coordinates representative of a configuration of the robot.

Thereafter, two logical operations are carried out on the Jacobian matrix: first, an inversion operation of the Jacobian matrix following a preestablished criterion, then a multiplication operation of the inverted matrix [Jinv]by the distance d of a fraction thereof (r.d).

It is known that the inversion of a rectangular (not squared) Jacobian matrix leads to several solutions and the preestablished criteria permit selection of one of them. In particular, this choice may be carried out in such a manner as to minimize the euclidian norm of the increments of the generalized coordinates of all of the stages. The inverted matrix is then the matrix known by the term "Moore-Penrose pseudo-inversion". This choice leads to minimizing at each step the displacement of each platform. It will be understood that other criteria of choice of invert may be used, while for example favoring the displacement of upper stages with respect those nearest to the base (in order to reduce the displaced masses). (One may refer to the following publication furnishing complete details of Jacobian matrices and their inversions: "Generation de movements en robotique. Application des inverse generalisees A. FOURNIER, state doctoral thesis, 1980 MONTPELLIER").

The multiplication operation with the distance or a fraction thereof furnishes an assemblage of increments [Jinv](r.d) which are then added to the generalized coordinates q representing the configuration of the robot at the preceding step for obtaining new generalized coordinates representing the new configuration of the robot.

When the distance d is great, it is desireable to operate the multiplication by a fraction (r.d) (r<1) of this distance, in order to obtain a non-oscillating convergence. This coefficient may be modified as a function of the distance at each iteration.

Simulations have shown that this iterative procedure using the Jacobian matrix permits a relatively rapid and reliable convergence to the final position to be attained by the terminal.

The iterative procedure is pursued with a test for verification of appurtenance of the positions represented by the generalized coordinates obtained, with the accessible positions represented by the accessible space data stored in the storage means 26.

In case of suitability of the positions calculated for the totality of accessible positions, the new configuration is validated for passing to the following step of the calculation.

In case of non-suitability, for each inadmissible situation calculated, a near accessible position is substituted, selected following a preestablished criterion. For example, with reference to the diagram of accessible situations of FIG. 8b, if one assumes that the non-accessible position of a platform is shown by the point P (p, Zp, Tp), the substitution criteria may consist in searching for an accessible position, first by modifying —t—, then if necessary by modifying Z, and finally, if necessary, by modifying a, In the case of point P, first the value —t— is modified for giving it a value 0, thene the ordinate Z is modified up to point P' where one attains an accessible position (p, Zp', 0). This substitution criterion may be used depending on the application.

Figure 11:
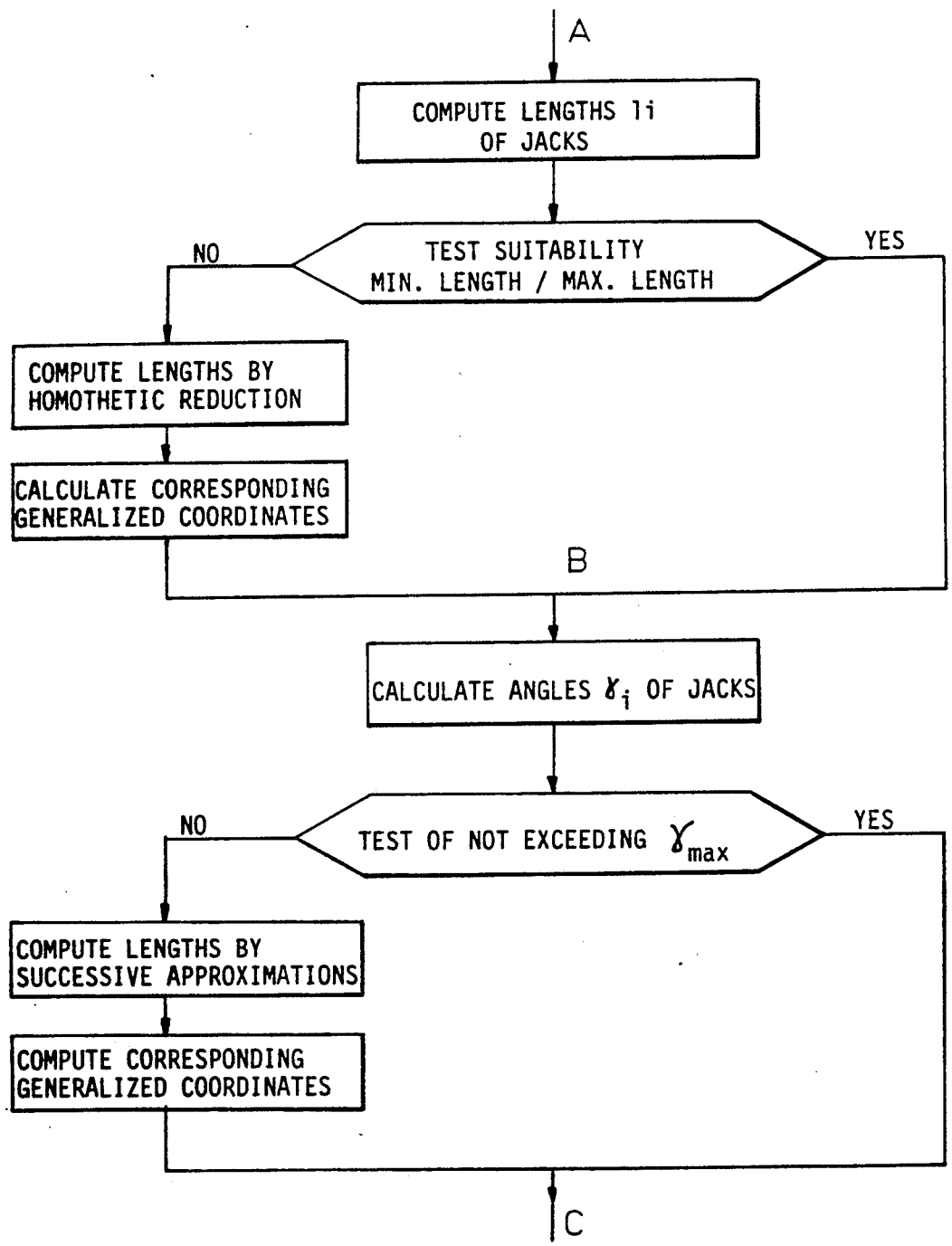

For example, the logic diagram of FIG. 11 illustrates a particular program for carrying out the operations op of verification and substitution (placed in evidence in a discontinuous framework in FIG. 10). This logic diagram relates to the case in which is stored in the memory means a database containing for each jack the lengths, minimum and maximum, and maximum angles of pivoting with respect to the normals for two adjacent platforms.

Starting from the calculated configuration (point A of the logic diagrams), that is the generalized coordinates of each stage, the calculation of corresponding length li of the 6 jacks is carried out for each stage (conventional vectoral calculation).

A test on each length li thus calculated is carried out: if one of the lengths li is outside the minimum length-maximum length range (output no), a substitution program consisting of causing a variation in a homothetic manner of all of the calculated lengths is carried out in order to bring the values exceeded within the authorized range.

Starting from the new lengths thus defined, the new generalized coordinates are calculated for the stage considered (conventional iterative calculation causing to intervene a squared Jacobian matrix).

At point B of the logic diagram, the generalized coordinates (either direct, or substituted) of each stage are arranged, and a calculation of the two angles $\gamma_i$ that the axis of each jack forms with the normals to the two contiguous platforms (conventional trigonometric calculation).

A test on each angle $\gamma_i$ thus calculated is carried out: if one of the angles $\gamma_i$ exceeds its maximum value (output: no), a substitution program is carried out by successive approximations (dichotomy method). This program comprises reducing the lengths li in a given ration with respect to an average length, then calculating the corresponding angles $\gamma_i$, and re-doing the test, these operations being repeated until the calculated angles become at least equal to the maximum admissible values.

Figure 12:
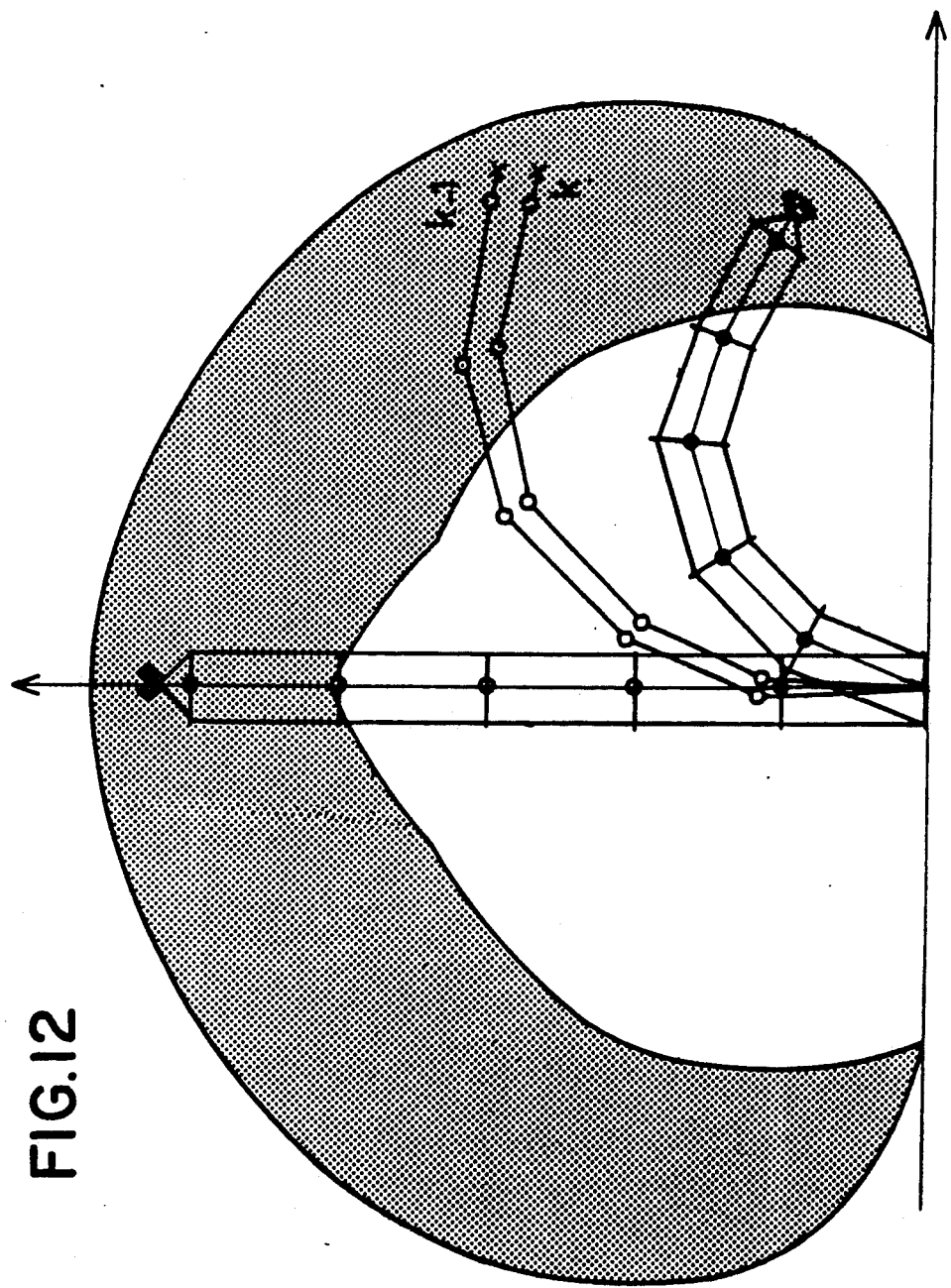
FIG. 12 is a schematic view showing, in cross-section, the accessible space in a position by the robot and the iterative process for determination of the corresponding configuration at a position to be attained.

At this moment, the generalized coordinates of the stage are calculated, which will serve to calculate the new position of the terminal for the iteration considered. This calculation furnishes thus a configuration of the robot, for which all the positions of the platform are accessible. FIG. 12 illustrates the configurations of the robot, at the iteration steps k−1 and k.

Starting from the new configuration thus calculated (direct or substituted), the corresponding operational coordinates of the terminal are determined.

This determination is carried out by a geometric calculation consisting of calculating the operational coordinates of the terminal (with respect to a reference connected to the base) starting from the generalized coordinates of all of the stages (assembly of coordinates of each platform in a reference connected to each preceding platform). This conventional calculation uses in particular matrices of passage of one reference connected to a stage to another connected to the preceding stage for gradually calculating the absolute coordinates of the platforms from the base to the terminal.

From these new operational coordinates, a new distance d = Xd − X is calculated for a new iterative step, as shown by the loop of the logic diagram of FIG. 10.

The configuration calculation means 27 includes an iterative step counter in order to stop the process when a predetermined number of iterations is achieved without obtaining a result (that is, d < e). In practice, this number will be a function of the application and the precision —e— desired (on the order of 10 to 50). Thus it is estimated that the position to be attained by the terminal is outside of the accessible domain of the robot.

For each stage, the generalized coordinates obtained at the output of the iterative calculation are delivered to the means 28 for calculating the states, which transforms them, for each actuator of the stage considered, into state data representative of the state which must be taken by these actuators for arranging the stage considered into the calculated position to which it corresponds.

The position of the platform of each stage being known with respect to the preceding platform (position, orientation), the calculation of the states consists of a geometric calculation of the lengths between the points of articulation of the actuators.

The state calculating means delivers, for each stage, six scalars representative of said lengths between points of articulation to the operating mechanism interface 30. This latter, which may be of the conventional "P.I.D." type (control "proportional, integral, derivative"), is either digital, or analog upon conversion.

At the end of the rotations of the electric motors of the actuators, the robot physically takes the form of the calculated configuration.

The lengths of the actuators, which correspond to the final positions of the specific terminal, may be stored in the status memory means 29, in order to carry out repetitive tasks without re-doing the configuration calculations, the state data being then injected directly into the operating mechanism interface 30.

Figure 13:
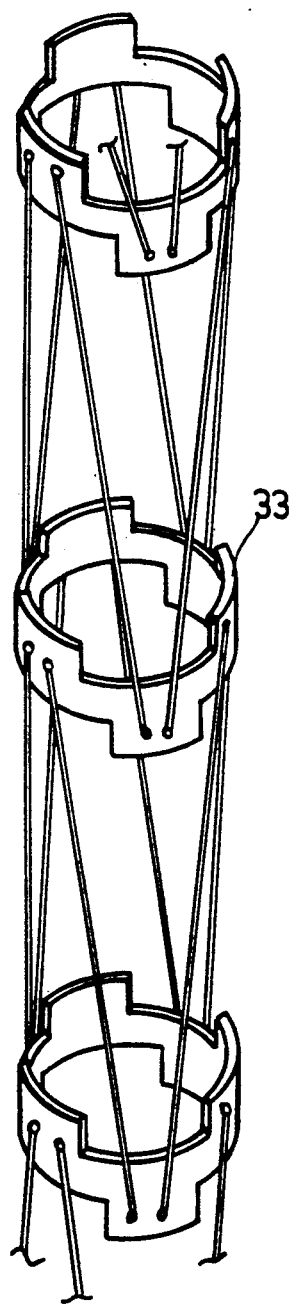

FIG. 13 presents an architectural variation of the robot, in which each platform 33 is formed by a ring (lattice of solid ring) provided with three projecting zones on the upper side and three projecting zones on the lower side. These zones are angularly displaced by 60°. The upper projecting zones each support the articulation of two actuators for the stage, while the lower projecting zones each support the articulation of two actuators of the following stage.

There is thusly obtained a structure in which the stages interpenetrate with each other, being therefor more compact. However, this advantage is obtained at the expense of flexing constraints in the platforms.

Figure 14:
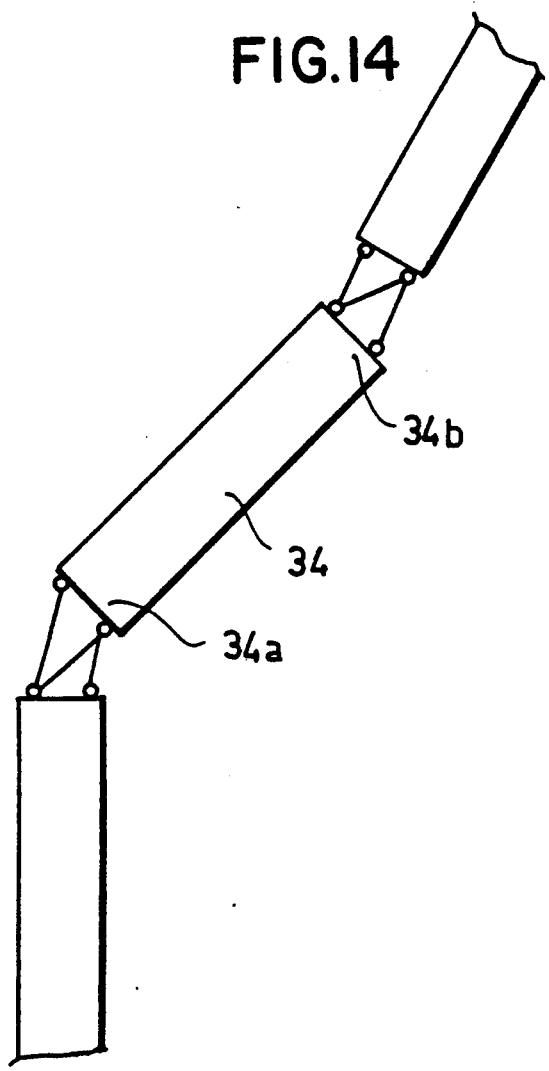

FIG. 14 illustrates another embodiment of the robot, which differs from the previous embodiments by the elongated form of the platforms, the other characteristics being identical. Each platform 34 is comprised of an elongated rigid member: a tubular or latticed cylinder. The actuators of one stage are articulated on an extremity 34a of the platform of the stage considered, the actuators of the following stage being articulated on the opposite extremity 34b of said platform.

Such a robot is able to cover a very wide range with respect to the number of stages, but at the price of a more limited working space of the robot immediate the base.

FIG. 15 illustrates another variation in which the auxiliary stages such as 35 are interposed between modular stages of the robot described above.

Each auxiliary stage has a geometry analogous to that of the modular stages, but two, three or four actuators are replaced by the rigid bars such as 36, in such a manner as to obtain an angular isostatic structure formed of six elements. In the example shown in the drawing, these six elements are formed by four actuators and two rigid bars.

The length of the rigid bars 36 is chosen with respect to that (minimum or maximum) of the actuators in order to shift the placement of the work space of the robot toward one or another section.

Such a robot is interesting in certain applications where a very large redundance would be superfluous, since eit permits reducing the cost of the structure and that of the control (because of the reduced number of actuators), while retaining the triangulated geometry of the structure and the inherent advantages thereof (very light weight with respect to possible loads).

What is claimed is:

1. A robot of a redundant and modular type permitting displacement of a terminal (7) from an initial position to a final position, comprising at least two stages arranged one after another, of which a first stage is fixed to a base and a last stage supports said terminal, each stage comprising a platform (2) and six linear actuators (3a–3f), each actuator being articulated at one end thereof to the associated platform by a ball-and-socket connection, and at the opposite end to the platform of the preceding stage by a ball-and-socket connection said six linear actuators being arranged according to a closed angular architecture in which two ends of two adjacent actuators are articulated in proximity to each other to one platform and at their other ends are articulated to the next platform spaced from each other in order to form an angle between the two actuators, each stage comprising a system of sensors (4a–4c), for delivering signals representative of the relative position of the platform of each stage with respect to that to the preceding stage, said robot further comprising:

accessible space data storage means (26) representative of accessible positions for each platform in a reference system connected to the preceding stage, means (25) for inputting operational coordinates representative of the final position to be attained, configuration computing means (27) for entering into the storage means (26) accessible space data and for receiving operational coordinates from the inputting means (25), said configuration computing means containing means for iterative calculations according to the following procedure:

computing the distance between the position of the terminal corresponding to the configuration obtained in the preceding stage and the final desired position, computing the Jacobian displacement matrix associated with the configuration obtained in the preceding stage, executing logical operations between the Jacobian matrix and the distance for determining a new position of the platform, the totality of said positions being representative of a new configuration of the robot, verifying the suitability of these positions with the accessible positions for each platform and, in case of unsuitability, substituting for the calculated position an accessible position, determining the position of the terminal corresponding to the new configuration, repeating this procedure until obtaining a distance between the final position and the last calculated position of the terminal which is less than a predetermined variation for determining a configuration of the robot for which the terminal (7) is situated in the final position and for delivering the generalized coordinates representative of said configuration or an information of impossibility, status calculating means (28) for receiving the generalized coordinates representative of the configuration of the robot for computing for each stage, the corresponding status data of the six linear actuators, an operating mechanism interface (30) for receiving the status data from the status calculating means (28) and the signals from the sensor system (4a, 4c) and adapted to deliver the proper magnitudes of control for controlling each of the linear actuators.

2. A robot as in claim 1, characterized in that the accessible space data storage means comprises memory means, storing for each architecture of stages a database containing for each actuator of the stage considered, the minimum and maximum length of this actuator and the maximum angles which may be made by said actuator with respect to normals to the two platforms to which said actuator is connected.

3. A robot as in claim 2 said verifying comprises at each iteration, computing for the new configuration of each stage, the length of the actuators and their angles with respect to the normals to the platforms, and comparing these lengths and angles to those contained in the accessible space data storage means for detecting the excess values.

4. A robot as in claim 1 and wherein said configuration computing means (27) contains a substitution program in which the substitution operates in case of non-appurtenance of a computed position of the assembly or accessible positions for a predetermined platform, consisting of computing the generalized coordinates representative of the closest accessible position following a preestablished criterion and substituting these coordinates for said platform.

5. A robot as in claim 4, characterized in that the configuration computing means comprises a substitution program consisting in case of an exceeded value of causing a variation in a homothetic manner of the lengths and angles of the actuators of the stage concerned for bringing the value or values exceeded within the authorized range, and computing the generalized coordinates of the resulting position.

6. A robot as in claim 1, characterized in that the inputting means for the operational coordinates representative of the final position to be attained comprises a remote sensing camera (24) for detecting a target to be reached, and treatment means (32) adapted to deliver from the signals coming from the remote sensing camera the coordinates representative of the spatial position and/or the spatial orientation of the target in a reference connected to the camera.

7. A robot as in claim 1, characterized in that the inputting means (25) comprises a sub-assembly (25a) for conversion of the coordinates, for transforming the coordinates from the treatment means (32) into operational coordinates with respect to a reference system connected to the base of the robot.

8. A robot as in claim 1, and wherein said logical operations between the Jacobian matrix and the distance consist successively of executing an inversion operation of the Jacobian matrix according to pre-established criteria, executing a multiplication of the inverted matrix by the distance for obtaining a set of increments, and executing an addition operation of said increments to the generalized coordinates corresponding to the preceding configuration for obtaining the generalized coordinates of the new configurations.

9. A robot as in claim 1, characterized in that the accessible space data storage means comprises means for storing a computing program, containing for each architecture of the stage, the relationships connecting the position (x, y, z) of the center of the platform of the stage with respect to the adjacent platform and the possible rotation ($\alpha$) of said platform following all the directions in space.

10. A robot as in claim 1, characterized in that accessible space data storage means (26) comprises storing means for storing, for each architecture of stages, a database divided into zones corresponding to the nodes of a spatial network, each zone containing data representative of the position of the corresponding node (x, y, z) and the digitized rotations for this node in predetermined directions ($r_1$, $r_2$, $r_3$).

11. A robot as in claim 1, characterized in that the means (25) for inputting the operational coordinates representative of the final position to be attained comprises a man/machine interface (31) for inputting the coordinates representative of the final spatial position to be attained for a given point connected to the terminal and/or the coordinates representative of the final orientation to be attained for said terminal.

12. A robot as in claim 1, in which the system of sensors (4a–4c) comprises a sensor mounted on each linear actuator, for delivering a signal representative of the length of said actuator.

13. A robot as in claim 1, in which the six actuators (3a, 3f) of each stage are articulated to the platform (2) of the respective stage in three distinct zones of said platform, and on the platform of the preceding stage (or on the base for the first stage) in three distinct zones of said platform (or of said base).

14. A robot as in claim 13, in which the six actuators (3a, 3f) of each stage are identical, the three zones of articulation of the actuators on the platform of the stage considered and the three zones of articulation of said actuators on the platform of the preceding stage being arranged at the apices of equilateral triangles.

15. A robot as in claim 13 characterized in that, on a given platform, the three zones of articulation of the actuators of the corresponding stage are approximately superimposed with the three zones of articulation of the actuators of the following stage.

16. A robot as in claim 15, characterized in that each platform comprises three articulation blocks (8a, 8b, 8c) connected by cross-members in a triangle (9a, 9b, 9c), each articulation block being adapted to receive the connections of a ball-and-socket type of four linear actuators belonging to two stages situated above and below the platform considered.

17. A robot as in claim 13, characterized in that on a given platform (33), the three zones of articulation of the actuators of the corresponding stage are angularly spaced by 60° with respect to the three zones of articulation of the actuators of the following stage.

18. A robot as in claim 13, characterized in that at least one platform comprises a rigid member of elongated form (34), the actuators of the stage concerned being articulated to an extremity (34a) of said member, and the actuators of the following stage being articulated to the opposite extremity (34b) of said member.

19. A robot as in claim 13, characterized in that it comprises auxiliary stages (35) interposed between said stages, termed modular stages, each auxiliary stage being composed of a platform or two, three or four linear actuators and a complementary number of rigid bars (36), in such a manner as to obtain a closed angular isostatic structure of six elements having a geometry analogous to that of a modular stage.

20. A robot as in claim 1, characterized in that each platform (2) is hollow in its central zone so as to preserve a central passage running along the robot for housing a transmission network (feed and control of the actuators, transmission of signals from the sensors, and feed and control of an active terminal).

21. A robot as in claim 1, characterized in that each platform comprises two plates (37, 38) assembled one on the other, for producing a module composed of a lower plate, six actuators, a system of sensors, and an upper plate.

22. A robot as in claim 1, characterized in that each linear actuator is articulated by a universal joint (22) at its extremities to the platform of the corresponding stage and to that of the preceding stage, each actuator being of a type adapted to permit a rotation about its longitudinal axis.

23. A robot as in claim 1, in which each linear actuator comprises a casing (19) connected to a nut (18), articulated at its extremity to a platform, a screw (17) threaded into said screw, a housing containing said screw in such a manner as to permit its free rotation, and an electric motor (14) carried by said housing and arranged to rotate said screw, the housing (15) being articulated on the other platform.

* * * * *